United States Patent
Dannhauer et al.

(10) Patent No.: US 7,278,318 B2
(45) Date of Patent: Oct. 9, 2007

(54) DIFFERENTIAL PRESSURE SENSOR COMPRISING A SYMMETRIC ERROR IN THE SEPARATING BODIES

(75) Inventors: Wolfgang Dannhauer, Teltow (DE); Dietfried Burczyk, Teltow (DE)

(73) Assignee: Endress + Hauser GmbH + Co. KG, Amulburg (DE)

(*) Notice: Subject to any disclaimer, the term of this patent is extended or adjusted under 35 U.S.C. 154(b) by 0 days.

(21) Appl. No.: 10/522,786

(22) PCT Filed: Jul. 18, 2003

(86) PCT No.: PCT/EP03/07842

§ 371 (c)(1),
(2), (4) Date: Feb. 6, 2006

(87) PCT Pub. No.: WO2004/013594

PCT Pub. Date: Feb. 12, 2004

(65) Prior Publication Data

US 2006/0162445 A1     Jul. 27, 2006

(30) Foreign Application Priority Data

Jul. 30, 2002   (DE) .............................. 102 34 754

(51) Int. Cl.
G01L 13/00 (2006.01)
(52) U.S. Cl. .......................... 73/716; 73/723
(58) Field of Classification Search ........... 73/700–756
See application file for complete search history.

(56) References Cited

U.S. PATENT DOCUMENTS 4,086,815 A * 5/1978 Asano et al. ................ 73/721
4,612,812 A * 9/1986 Broden ........................ 73/718
5,804,735 A * 9/1998 Biskup ........................ 73/706
7,073,385 B2 * 7/2006 Troyer ........................ 73/700
7,171,851 B2 * 2/2007 Kamata .................... 73/152.59

* cited by examiner

Primary Examiner—Edward Lefkowitz
Assistant Examiner—Jermaine Jenkins
(74) Attorney, Agent, or Firm—Bacon & Thomas, PLLC

(57) ABSTRACT

A pressure-difference sensor, which is asymmetrical by design, includes a measuring apparatus having a first half-chamber with a first volume $V_1$, which is sealed by a first separating membrane having a first membrane stiffness $E_1$, and a second half-chamber with a second volume $V_2$, which is sealed by a second separating membrane having a second membrane stiffness $E_2$, wherein the first half-chamber is separated from the second half-chamber by a pressure sensitive element, especially a measuring membrane, and the first half-chamber is filled with a first transfer liquid having a first coefficient of thermal expansion $\alpha_1$ and the second half-chamber is filled with a transfer liquid having a second coefficient of thermal expansion $\alpha_2$. For making the temperature-dependent, separating-membrane pressure-error dP symmetrical, the design is so embodied that a first product of the first membrane stiffness, the first volume and the first coefficient of thermal expansion is essentially equal to a second product of the second membrane stiffness, the second volume and the second coefficient of thermal expansion ($E_1 * V_1 * \alpha_1 = E_2 * V_2 * \alpha_2$), wherein, additionally, at least one factor of the first product deviates, by design, from the corresponding factor of the second product.

7 Claims, 2 Drawing Sheets

Figure 1:
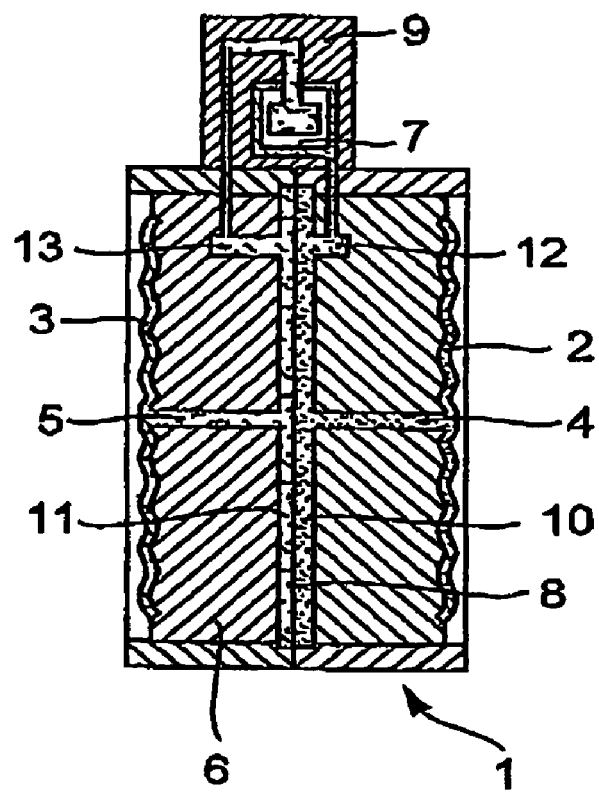

DIFFERENTIAL PRESSURE SENSOR COMPRISING A SYMMETRIC ERROR IN THE SEPARATING BODIES

TECHNICAL FIELD

The present invention relates to a relative-pressure sensor, or a pressure-difference sensor, especially those using hydraulic pressure transfer.

BACKGROUND OF THE INVENTION

Such pressure sensors with hydraulic pressure transfer involve, as a rule, a measuring apparatus having two half-chambers, which are, in each case, sealed by a separating membrane, or diaphragm, and filled with a transfer medium. The separating membranes are loaded, respectively, with a pressure to be measured and with a reference pressure, and these pressures are then transferred via the separating membranes into the respective half-chambers. The half-chambers are separated from one another by a sensor element, which has a pressure sensitive element, especially a measuring membrane, which is loaded on its first surface with the hydraulic pressure in the first half-cell and on its second surface with the hydraulic pressure in the second half-cell.

The separating membranes have finite stiffnesses, so the pressure in each half cell differs by a pressure $dP_m$ from the pressure on the separating membrane, with the pressure deviation $dP_m$ being a function of the deflection of the separating membrane.

Since the measuring element of the sensor element is usually very stiff, the deflection of the separating membrane due to fluctuations of the external pressure can, to a first approximation, be neglected. The significant deflections are caused by the thermal expansion of the transfer medium in the half-chambers of the measuring apparatus.

Due to boundary-conditions of the design and due to manufacturing tolerances, it is very difficult, or practically impossible, to construct a measuring mechanism having perfectly symmetrical half-chambers. That is, small deviations remain between the volumes of the half-chambers, and the stiffnesses of the two separating membranes are not absolutely identical. This has the consequence that, for example, in the case of a warming of the transfer liquid in the two half-chambers, the measuring element is loaded from its two, pressure sensitive sides, with a different hydrostatic pressure, although, for example, externally, identical pressures are acting on the two separating membranes. This leads to a temperature-dependent shifting of the zero point of the measurement signal.

SUMMARY OF THE INVENTION

An object of the present invention is, therefore, to provide a pressure-difference sensor overcoming the described disadvantages.

This object is achieved by a pressure-difference sensor which includes a measuring apparatus having a first half-chamber with a first volume $V_1$, which is sealed by a first separating membrane having a first membrane stiffness $E_1$ and a second half-chamber with a second volume $V_2$, which is sealed by a second separating membrane having a second membrane stiffness $E_2$, with the first half-chamber being separated from the second half-chamber by a pressure sensitive element, especially a measuring membrane, and the first half-chamber being filled with a first transfer liquid having a first coefficient of thermal expansion $\alpha_1$ and the second half-chamber being filled with a second transfer liquid having a second coefficient of thermal expansion $\alpha_2$, with a first product of the first membrane stiffness, the first volume and the first coefficient of thermal expansion being essentially equal to a second product of the second membrane stiffness, the second volume and the second coefficient of thermal expansion ($E_1 * V_1 * \alpha_1 = E_2 * V_2 * \alpha_2$), and with, additionally, at least one factor of the first product deviating, by design, from the corresponding factor of the second product.

which includes a measuring apparatus having a first half-chamber with a first volume $V_1$, which is sealed by a first separating membrane having a first membrane stiffness $E_1$ and a second half-chamber with a second volume $V_2$, which is sealed by a second separating membrane having a second membrane stiffness $E_2$, with the first half-chamber being separated from the second half-chamber by a pressure sensitive element, especially a measuring membrane, and the first half-chamber being filled with a first transfer liquid having a first coefficient of thermal expansion $\alpha_1$ and the second half-chamber being filled with a second transfer liquid having a second coefficient of thermal expansion $\alpha_2$, with a first product of the first membrane stiffness, the first volume and the first coefficient of thermal expansion being essentially equal to a second product of the second membrane stiffness, the second volume and the second coefficient of thermal expansion ($E_1 * V_1 * \alpha_1 = E_2 * V_2 * \alpha_2$), and with, additionally, at least one factor of the first product deviating, by design, from the corresponding factor of the second product.

The absolute equality of two products whose respective factors are real-world variables can hardly ever be achieved in a real setting, although one can strive to attain it.

Essentially, "equal" is taken here to mean that the products deviate from one another by not more than 1%, preferably by not more than 0.3%, and especially preferably by not more than 0.1%. The equality of the products within these described deviations must be fulfilled at least at 20° C., preferably between 0° C. and 40° C., more preferably between −20° C. and 60° C., and especially preferably between −40° C. and 80° C.

In a preferred form of embodiment, the measuring mechanism has at least one adjustable filler, which adjusts the volume of the first, or the second, half-chamber to a degree such that the above-defined products are identical according to the invention. Optionally, both half-chambers have adjustable fillers.

Instead of the described adjustable filler, or adjustable fillers, which are implemented, for example, as plungers, screws or plugs, which can adjust half-chamber volume in a continuous manner, other variants involve placing one or more fillers into a compartment communicating with an associated half-chamber. These fillers can be, for example, cylinders, or disks, placed in sufficient quantity into a corresponding bore, until the volume of the half-chamber is adjusted to the desired value. Serving for securing the fillers is, for example, a compressive spring, which, itself, is a filler. The spring is axially compressed between the cylinders (or disks) and a seal sealing the half-chamber pressure tightly.

In the normal case, the same hydraulic transfer medium is used in both half-chambers, so that the first coefficient of thermal expansion $\alpha_1$ is equal to the second coefficient of thermal expansion $\alpha_2$.

In general, it is, however, also possible, to adapt the coefficient of thermal expansion of at least one transfer liquid such that the identity of the products desired according to the invention is achieved. In a mixture of, for example, a silicone oil and a mineral oil, the coefficient of thermal expansion is a function of the relative amounts of the two oils. Therefore, the desired coefficient of thermal expansion can be achieved by an appropriate mixing of the oils. The same effect can be achieved by a mixing of silicone oils of different molecular weights. This alternative is especially desirable, when the freedom of design is limited in the case of other parameters, i.e. when the volume can only be varied within narrow limits, and the volumes of the first and second half-chambers deviate from one another to such a degree, that the compensation can not be achieved in reasonable manner by a selecting of membrane stiffness.

Of course, however, also the stiffness of the separating membranes is a parameter, which, for given membrane diameter and given membrane material, can still be adjusted on the basis of both membrane thickness and the extent of the corrugations.

For putting the present invention into practice, therefore, in the face of design boundary conditions which compellingly require different volumes in the first and second half-chambers, a first equalization, by design, can occur by adjusting membrane stiffness. In a preferred form of embodiment, the product of the first membrane stiffness and the first volume is equal to the product of the second membrane stiffness and the second volume. When an equality of these products is still not obtained in this way, then a further equalization can still occur by selecting transfer media with suitable coefficients of thermal expansion. While the described tuning is of a design nature and will usually affect the entire production of a model of pressure sensor, nevertheless a fine tuning of the half-chamber volumes can still subsequently occur by the use of fillers, as described above, in order to cancel individual, thermal, zero-point fluctuations due to manufacturing tolerances.

BRIEF DESCRIPTION NOF THE DRAWINGS

Figure 2:
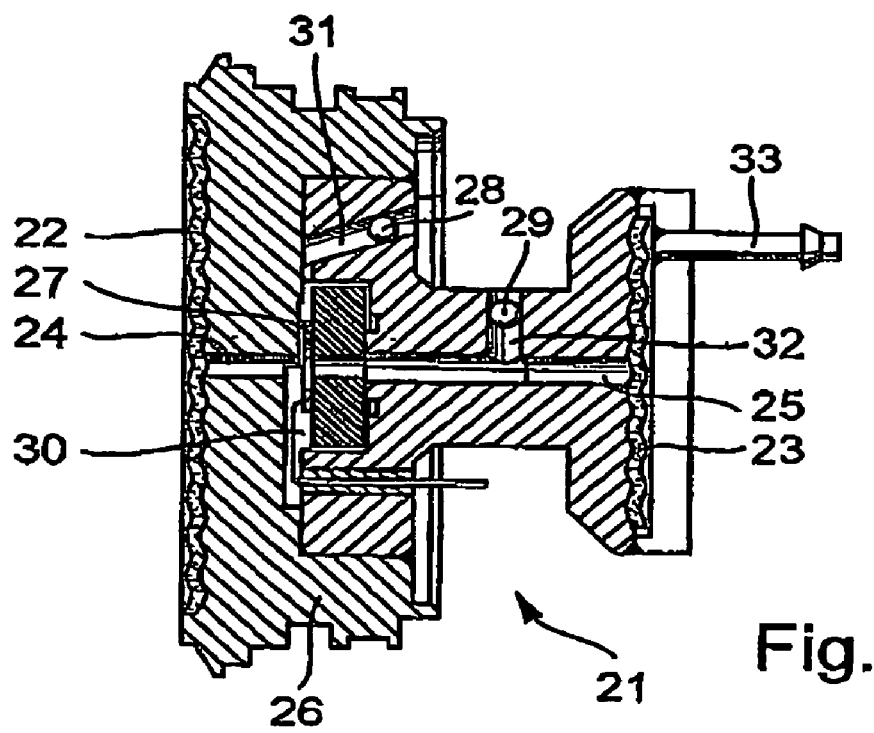
Figure 3A:
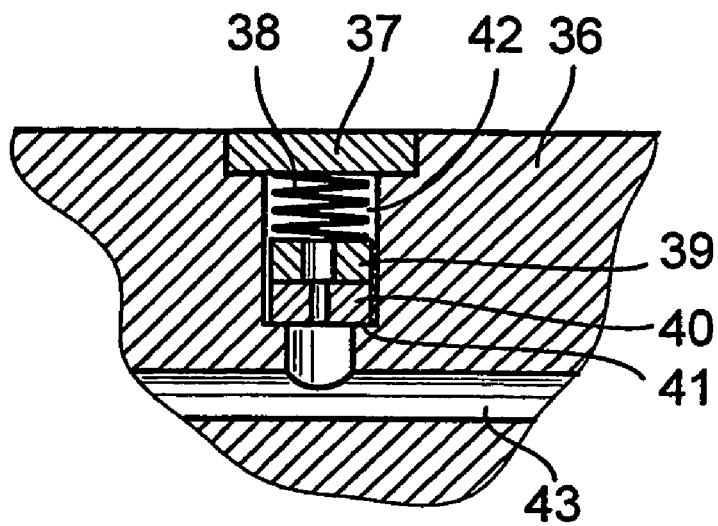
Figure 3B:
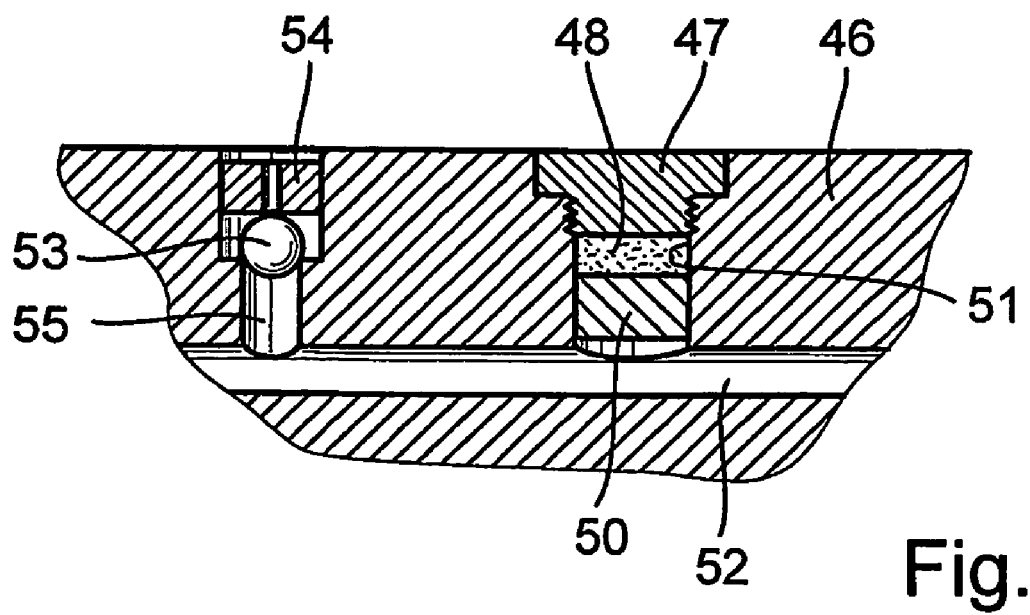

The invention will now be described in further detail on the basis of the forms of embodiment presented in the drawing, the figures of which show as follows:

FIG. 1 a cross section through a pressure-difference sensor having a hydrostatically seated measuring cell;

FIG. 2 a relative pressure sensor of asymmetric construction;

FIG. 3*a* a detail view of a first form of embodiment of a mechanism for controlling the volume of a half-chamber; and FIG. 3*b* a detail view of a second form of embodiment of a mechanism for controlling the volume of a half-chamber.

DESCRIPTION OF THE PREFERRED EMBODIMENTS

The pressure-difference sensor shown in FIG. 1 includes a measuring apparatus having a cylindrical platform 6, on whose two end faces membrane beds are provided. Extending over the membrane bed on the left side of the figure is a separating membrane 3, which is secured at its edge to the end face of the platform 6. In the same way, extending over a membrane bed on the oppositely lying end face of the platform 6 is a separating membrane 2. Extending axially inwardly into the platform from each of the end faces is a pressure canal 4, 5, with the two pressure canals in the case of this form of embodiment each opening into a chamber portion covering almost the entire cross section of platform 6. Arranged between the two chamber portions 10, 11 is an overload membrane, or diaphragm, 8, which is substantially stiffer than the two separating membranes 2, 3. Extending from the two chamber portions 10, 11 is, in each case, a canal 12, 13, respectively, to the high- and low-, pressure sides of a measuring membrane 7 of a sensor element arranged in a sensor element housing 9 mounted on the lateral surface of the platform. Thus, the measuring membrane separates the half-chambers from one another. The sensor element is seated isostatically in the sensor element housing 9, i.e. the sensor element is loaded with the pressures of the transfer liquids not only in the region of the measuring membrane, but also in the region of its lateral surface. In such case, the pressure of the high-pressure side acts via the canal 12 on the outer surface of the measuring membrane 7 and the outer, lateral surfaces of the sensor element. The pressure of the low-pressure side is led via the canal 13 onto the inner surface of the measuring membrane 7 and the inner lateral surfaces of the sensor element. It is evident that the isostatic seating of the described sensor element does not lead, without more, to equal volumes on the high-, and low-, pressure sides. By suitable arrangement of the canals, i.e. by suitable selection of canal lengths and canal diameters, the desired identical volumes can, however, be achieved. Especially in the case of a pressure-difference sensor, the separating membranes should, ideally, be identical on the high-, and low-, pressure sides. Also, it is desirable to use the same transfer liquids on the high-, and low-, pressure sides, since these have, besides an identical coefficient of thermal expansion, also an identical viscosity. I.e., as far as possible, an equalizing, by design, of the volumes of the chamber portions is the preferred solution. To this end, the pressure-difference sensor shown in FIG. 1 can be equipped additionally, with at least one adjustable filler, in order, as required, to optimize the equalizing of the volumes of the first and second chamber portions. Details for fine-tuning the volumes are discussed below on the basis of the FIGS. 3*a* and 3*b*. Should the equalizing of the volumes not be possible, due to boundary conditions of the design, then, in the case of essentially equal membrane stiffnesses, transfer media of different coefficients of thermal expansion are to be used.

FIG. 2 shows a pressure sensor of the invention, especially a relative pressure sensor. The measuring apparatus 21 includes a platform 26 having an essentially axially symmetric structure, wherein there is provided on a first end face of the platform 26 a membrane bed, over which a separating membrane 22 is secured at its edge to the platform 26. A measured-pressure canal 24 extends from the membrane bed into a sensor element chamber 30, in which the sensor element 27 is arranged. Also formed in the platform is a filling canal 31, which communicates with the pressure chamber 30 and is pressure-tightly sealed by a sealing element 28. In the illustrated form of embodiment, the sealing element is a steel ball, which is inserted a defined depth into the filling canal 31. However, other forms of sealing means can be used in place thereof; see below in connection with the descriptions of FIGS. 3*a* and 3*b*. The sensor element is mounted pressure-tightly on its base surface in the pressure chamber 30 and is isostatically seated. The first half-chamber of this measuring apparatus includes, therefore, the volume enclosed between the separating membrane and the measuring membrane, the measured-pressure canal 24, the volume of the sensor chamber 30 surrounding the sensor element 27, and the filling canal 31, up to the seal 28. In so far as the present relative-pressure sensor is to be temperature compensated, the atmospheric pressure is not fed directly onto the rear face of the measuring membrane of the sensor element 27, but, instead, there is a hydraulic pressure-transferring of the atmospheric pressure, which acts via a tube 33 on an atmosphere-side, separating membrane 23 secured over a membrane bed on the second end face of the platform 26. Extending from the membrane bed under the atmosphere-side, separating membrane 23, to the rear face of the membrane of the sensor element 27, is a reference-pressure canal 25. Extending from the reference-pressure canal 25 in a radial direction to the lateral surface of the platform 26 is a filling canal 32. Canal 32 is sealed by means of a sealing element 29, which, for controlling the volume, is positionable at any depth. Instead of the ball 29 shown here, other sealing elements can, again, be selected, such as are described below in connection with FIGS. 3a and 3b.

The volume enclosed between the atmosphere-side, separating membrane 23 and the rear face of the measuring membrane of the sensor element 27 defines the second half-chamber. To the extent that, in the case of this embodiment, boundary conditions of the design can complicate the complete equalizing of the products of membrane stiffness and associated volume, a selecting of suitable silicone oils of different coefficients of thermal expansion is to be considered, as required, in order to cancel the differences.

[Suitable are, for example, silicone oils of the series AK, obtainable from Wacker Chemie. The silicone oils (dimethylpolysiloxanes) presented in the following table have the same basic structure and differ only in chain length.

| Designation | Viscosity | Expansion Coefficient |
| --- | --- | --- |
| AK 10 | 10 mm$^2$/s | 10.0 cm$^3$/(cm$^3$ ° C.) × 10$^4$ |
| AK 20 | 20 mm$^2$/s | 9.7 cm$^3$/(cm$^3$ ° C.) × 10$^4$ |
| AK 35 | 35 mm$^2$/s | 9.5 cm$^3$/(cm$^3$ ° C.) × 10$^4$ |
| AK 100 | 100 mm$^2$/s | 9.4 cm$^3$/(cm$^3$ ° C.) × 10$^4$ |
| AK 500 | 500 mm$^2$/s | 9.25 cm$^3$/(cm$^3$ ° C.) × 10$^4$ |

In the ideal case, the design should be so tuned that the ratio of the products of membrane stiffness and associated volume corresponds to the ratio of the expansion coefficients of two oil types. In such case, attention is to be paid to the fact that the viscosity of the silicone oils with low coefficients of thermal expansion sets narrow limits on the freedom to choose. For fine tuning, silicone oils of different coefficients of thermal expansion are theoretically mixable, in order to obtain a value intermediate their coefficients of thermal expansion. Currently, however, it is preferred to use a fine tuning of the volumes by means of adjustable fillers, or sealing elements, as compared to an adjusting of the coefficient of thermal expansion of the transfer liquid by mixing.

FIGS. 3a and 3b illustrate two mechanisms for fine-tuning the volumes of the half-chambers. FIG. 3a shows a detail section through the platform 36 of a measuring apparatus in the region of its lateral surface. Filling canal 42 extends radially inwards from the lateral surface of the platform 36, and opens into a canal 43, which forms part of one of the two half-chambers. Filling canal 42 has, shortly before its opening into the canal 43, a narrower cross section, whereby an axial abutment surface 41 is formed, on which filler elements 39, 40 can sit. Each of the filler elements 39, 40 has a defined volume, which, in the case of constant height and constant outer diameter, is adjustable by varying the diameter of a central bore through the filler. By selection of suitable fillers, even the smallest of deviations between the products of the stated variables can be canceled. The fillers are held in position by a compression spring 38, which is axially compressed between the fillers and a screwed closure 37. Of course, spring 38 serves, at the same time, itself as a filler. The advantage of the arrangement, as just described, is that the transfer liquid displaced by the fillers can escape from the same opening, into which the fillers are inserted. To such extent, no additional housing opening is required in the case of this solution, since an opening for the filling of chamber portions is required anyway. This solution is, however, complex, in that, depending on the desired accuracy of the compensation, a multiplicity of different fillers needs to be kept at hand, or else a custom manufacturing of a filler of defined volume needs to be done.

FIG. 3b shows, in contrast, a variant of a mechanism for adjusting the volume of a chamber portion requiring no inventory of differing fillers or even the mentioned custom manufacturing. In the case of this variant, the platform 46 has a bore 51 with a fine thread. Bore 51 opens into a canal 52, which is part of a half-chamber. Screwed into the fine thread is a plug 51, which sits engaged with the thread so tightly, that practically no transfer liquid can flow through the threaded areas past the plug. Optionally, the lateral surface of the plug is coated with a sealing mass, which, if required, can be thermally hardened. Extending from the canal 52 to the lateral surface of the platform 46 is a filling canal 55, which has, in a first section, a smaller diameter than in a second section, which follows on the first section and extends out to the lateral surface of the platform 46. Between the second section and the first section, a step is, therefore, formed, which axially supports a steel ball 53, which has a smaller diameter than the second section and a larger diameter than the first section. The ball is pressed pressure-tightly against the axial abutment surface by means of a pierced screw 54, which is engaged with a thread in the wall of the second section. For fine-tuning of the volume, first the pierced screw 54 is loosened, then the plug 50 is screwed into the bore 51 for correcting the volume. The displaced transfer liquid can discharge through the exit canal 55, past the ball 53, through the pierced screw 54. Following attainment of the desired volume, screw 54 is tightened again. For fixing screw 50 in place, a cast material 48 is supplied, as required. Additionally, bore 51 can be closed on the lateral surface of the platform 46 by a closure screw 47, in order to prevent inadvertent changing of the volume.

The invention claimed is:

1. A relative pressure sensor, or pressure-difference sensor, comprising:

a measuring apparatus having:

a first half-chamber defining a first volume;

a first separating membrane for sealing said first half-chamber, and having a first membrane stiffness;

a second half-chamber defining a second volume;

a second separating membrane for sealing said second-half chamber, and having a second membrane stiffness; and a measuring membrane which separates said first half-chamber from said second half-chamber, wherein:

said first-half chamber is filled with a transfer liquid having a first coefficient of thermal expansion, and said second half-chamber is filled with a second transfer liquid having a second coefficient of thermal expansion;

a first product of said first membrane stiffness, said first volume and said first coefficient of thermal expansion is essentially equal to a second product of said second membrane stiffness, said second volume and said second coefficient of thermal expansion; and at least one factor of said first product deviates from the corresponding factor of said second product.

2. The relative pressure sensor as claimed in claim 1, wherein:
said first membrane stiffness deviates from said second membrane stiffness.

3. The relative pressure sensor as claimed in claim 1, wherein:
said first volume deviates from said second volume.

4. The relative pressure sensor as claimed in claim 1, wherein:
said first coefficient of thermal expansion deviates from said second coefficient of thermal expansion.

5. A relative pressure sensor, or pressure-difference sensor, comprising:
a measuring apparatus having:
a first half-chamber defining a first volume;
a first separating membrane for sealing said first half-chamber, and having a first membrane stiffness;
a second half-chamber defining a second volume;
a second separating membrane for sealing said second-half chamber, and having a second membrane stiffness; and
a measuring membrane which separates said first half-chamber from said second half-chamber, wherein:
said first-half chamber is filled with a transfer liquid having a first coefficient of thermal expansion, and said second half-chamber is filled with a second transfer liquid having a second coefficient of thermal expansion;
a first product of said first membrane stiffness, said first volume and said first coefficient of thermal expansion is essentially equal to a second product of said second membrane stiffness, said second volume and said second coefficient of thermal expansion;
at least one factor of said first product deviates from the corresponding factor of said second product; and
said first coefficient of thermal expansion is equal to said second coefficient of thermal expansion.

6. The pressure sensor as claimed in claim 5, further comprising:
mechanisms for fine tuning volume in each of said two half-chambers.

7. A relative pressure sensor, or pressure-difference sensor, comprising:
a measuring apparatus having:
a first half-chamber defining a first volume;
a first separating membrane for sealing said first half-chamber, and
having a first membrane stiffness;
a second half-chamber defining a second volume;
a second separating membrane for sealing said second-half chamber, and having a second membrane stiffness;
a measuring membrane which separates said first half-chamber from said second half-chamber;
at least one mechanism for fine tuning volume in a half-chamber, wherein:
said first-half chamber is filled with a transfer liquid having a first coefficient of thermal expansion, and said second half-chamber is filled with a second transfer liquid having a second coefficient of thermal expansion;
a first product of said first membrane stiffness, said first volume and said first coefficient of thermal expansion is essentially equal to a second product of said second membrane stiffness, said second volume and said second coefficient of thermal expansion; and
at least one factor of said first product deviates from the corresponding factor of said second product.

* * * * *